US010823467B2

(12) United States Patent
Jonsson et al.

(10) Patent No.: US 10,823,467 B2
(45) Date of Patent: Nov. 3, 2020

(54) LOW-OIL REFRIGERANTS AND VAPOR COMPRESSION SYSTEMS

(71) Applicant: Carrier Corporation, Jupiter, FL (US)

(72) Inventors: Ulf J. Jonsson, South Windsor, CT (US); Zissis A. Dardas, Worcester, MA (US); Vishnu M. Sishtla, Manlius, NY (US); Daniel G. Goberman, East Grandby, CT (US); Zaffir A. Chaudhry, S. Glastonbury, CT (US); Xia Tang, West Hartford, CT (US); Susanne M. Opalka, Glastonbury, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 15/563,146

(22) PCT Filed: Mar. 30, 2016

(86) PCT No.: PCT/US2016/024826
§ 371 (c)(1),
(2) Date: Sep. 29, 2017

(87) PCT Pub. No.: WO2016/160873
PCT Pub. Date: Oct. 6, 2016

(65) Prior Publication Data
US 2018/0073785 A1 Mar. 15, 2018

Related U.S. Application Data

(60) Provisional application No. 62/140,086, filed on Mar. 30, 2015.

(51) Int. Cl.
F25B 31/00 (2006.01)
F25B 1/053 (2006.01)
(Continued)

(52) U.S. Cl.
CPC ............ F25B 31/002 (2013.01); C09K 5/044 (2013.01); C09K 5/045 (2013.01); C10M 105/38 (2013.01);
(Continued)

(58) Field of Classification Search
None
See application file for complete search history.

(56) References Cited

U.S. PATENT DOCUMENTS 3,773,695 A * 11/1973 Argabright ............ C07C 263/00
521/161
3,887,756 A * 6/1975 Gerstin ................... C08L 23/16
428/424.8

(Continued)

FOREIGN PATENT DOCUMENTS

AU 2006201160 A1 10/2007
CN 103097733 A 5/2013
(Continued)

OTHER PUBLICATIONS

David C. Brondum et al., "High-Speed, Direct-Drive Centrifugal Compressors for Commercial HVAC Systems," Presented at the 1998 International Compressor Conference at Purdue, 1998.
(Continued)

Primary Examiner — Ljiljana V. Ciric
(74) Attorney, Agent, or Firm — Bachman & LaPointe, P.C.

(57) ABSTRACT

A vapor compression system (20) has: a centrifugal compressor (22) having an inlet (40) and an outlet (42); and an electric motor (28) having a stator (30) and a rotor (32). A plurality of bearings (36) support the rotor. A refrigerant charge comprises a base refrigerant and one or more oils. The one or more oils are present at a total concentration of 80-5000 parts per million (ppm) by weight.

18 Claims, 7 Drawing Sheets

(51) Int. Cl.
  *F25B 1/10* (2006.01)
  *F25B 25/00* (2006.01)
  *C10M 171/00* (2006.01)
  *C09K 5/04* (2006.01)
  *F04D 29/059* (2006.01)
  *F04D 29/063* (2006.01)
  *F04D 17/12* (2006.01)
  *C10M 105/38* (2006.01)
  *C10N 20/00* (2006.01)
  *C10N 30/06* (2006.01)
  *C10N 40/30* (2006.01)
  *F04D 17/10* (2006.01)
  *F04D 25/06* (2006.01)

(52) U.S. Cl.
  CPC ......... *C10M 171/008* (2013.01); *F04D 17/12* (2013.01); *F04D 29/059* (2013.01); *F04D 29/063* (2013.01); *F25B 1/053* (2013.01); *F25B 1/10* (2013.01); *F25B 25/005* (2013.01); *F25B 31/008* (2013.01); *C09K 2205/126* (2013.01); *C09K 2205/24* (2013.01); *C10M 2203/065* (2013.01); *C10M 2203/1006* (2013.01); *C10M 2205/0285* (2013.01); *C10M 2207/2835* (2013.01); *C10M 2209/043* (2013.01); *C10M 2209/1033* (2013.01); *C10N 2020/099* (2020.05); *C10N 2020/101* (2020.05); *C10N 2030/06* (2013.01); *C10N 2040/30* (2013.01); *F04D 17/10* (2013.01); *F04D 25/06* (2013.01); *F25B 2339/047* (2013.01); *F25B 2400/13* (2013.01)

(56) References Cited

U.S. PATENT DOCUMENTS

| | | | | |
|---|---|---|---|---|
| 3,954,638 | A * | 5/1976 | Jones | B60T 8/26 508/251 |
| 4,036,643 | A * | 7/1977 | Viro | G03C 8/045 430/241 |
| 4,036,799 | A * | 7/1977 | Westermann | C08L 11/00 524/62 |
| 4,043,941 | A * | 8/1977 | White | B01J 37/00 502/171 |
| 4,049,565 | A * | 9/1977 | Nnadi | C08F 8/30 508/289 |
| 4,100,123 | A * | 7/1978 | Westermann | C08L 95/00 524/519 |
| 4,128,488 | A * | 12/1978 | Steckel | C10L 1/221 508/460 |
| 4,131,554 | A * | 12/1978 | Steckel | C10M 159/22 508/460 |
| 4,203,855 | A * | 5/1980 | Steckel | C10M 159/12 508/223 |
| 4,216,099 | A * | 8/1980 | Steckel | C08F 8/42 252/389.1 |
| 4,239,636 | A * | 12/1980 | Brois | C08F 8/14 508/305 |
| 4,291,117 | A * | 9/1981 | Ohishi | G03F 7/32 430/154 |
| 4,347,121 | A * | 8/1982 | Mayer | B01J 29/70 208/18 |
| 4,350,753 | A * | 9/1982 | Shelnut | G03F 7/105 430/165 |
| 4,420,647 | A * | 12/1983 | Hammond | C10M 111/02 585/10 |
| 4,434,308 | A * | 2/1984 | Larkin | C07C 2/20 585/10 |
| 4,490,265 | A * | 12/1984 | Holstedt | C10L 1/14 508/196 |
| 4,714,794 | A * | 12/1987 | Yoshida | C10M 105/06 585/26 |
| 4,737,297 | A * | 4/1988 | Yoshida | C07C 2/66 508/110 |
| 4,828,727 | A * | 5/1989 | McAninch | C10M 101/02 508/534 |
| 5,030,370 | A * | 7/1991 | Patil | C10M 149/04 508/556 |
| 5,150,974 | A * | 9/1992 | Tamada | F16C 33/62 384/463 |
| 5,152,844 | A * | 10/1992 | Wilwerding | A62D 3/34 134/25.1 |
| 5,469,713 | A | 11/1995 | Wardle et al. | |
| 5,549,849 | A * | 8/1996 | Namura | C08K 3/04 252/502 |
| 5,557,944 | A | 9/1996 | Hirano et al. | |
| 5,814,715 | A * | 9/1998 | Chen | C08F 210/00 526/348.6 |
| 5,834,407 | A * | 11/1998 | Manka | C10M 129/20 508/271 |
| 5,880,072 | A * | 3/1999 | Furey | C10M 141/06 508/263 |
| 5,881,564 | A | 3/1999 | Kishimoto et al. | |
| 6,063,973 | A * | 5/2000 | Sen | C07C 2/30 585/18 |
| 6,082,132 | A | 7/2000 | Numoto et al. | |
| 6,176,092 | B1 | 1/2001 | Butterworth et al. | |
| 6,279,340 | B1 | 8/2001 | Butterworth et al. | |
| 6,291,540 | B1 * | 9/2001 | Priou | C07C 25/18 522/100 |
| 6,322,892 | B1 * | 11/2001 | Takami | C08G 59/22 427/386 |
| 6,340,659 | B1 * | 1/2002 | Kocsis | C10M 159/12 508/518 |
| 6,436,309 | B1 | 8/2002 | Ankner et al. | |
| 6,564,560 | B2 | 5/2003 | Butterworth et al. | |
| 6,565,477 | B2 * | 5/2003 | Yoshida | F16H 15/38 384/463 |
| 6,579,833 | B1 * | 6/2003 | McNallan | C04B 35/62884 508/100 |
| 6,814,685 | B2 * | 11/2004 | Hirai | F16C 33/64 384/492 |
| 6,986,647 | B2 | 1/2006 | Jones et al. | |
| 7,090,404 | B2 | 8/2006 | Morales et al. | |
| 7,208,098 | B2 | 4/2007 | Li et al. | |
| 7,390,928 | B2 * | 6/2008 | Hobbs | C10M 133/12 564/433 |
| 7,462,128 | B2 * | 12/2008 | Uchiyama | C23C 8/02 384/492 |
| 8,246,852 | B2 | 8/2012 | Serrano et al. | |
| 8,322,149 | B2 | 12/2012 | Thomas et al. | |
| 8,360,650 | B2 | 1/2013 | Morales Espejel et al. | |
| 8,480,919 | B2 | 7/2013 | Kaneko et al. | |
| 8,691,109 | B2 | 4/2014 | Hessell et al. | |
| 8,703,690 | B2 | 4/2014 | Van Horn et al. | |
| 8,852,449 | B2 | 10/2014 | Carr et al. | |
| 10,208,241 | B2 * | 2/2019 | Agrawal | A61K 8/87 |
| 10,323,203 | B2 * | 6/2019 | Patil | C10M 105/18 |
| 10,323,204 | B2 * | 6/2019 | Patil | C10M 105/18 |
| 10,407,780 | B2 * | 9/2019 | Murahara | C25B 1/16 |
| 2002/0039949 | A1 * | 4/2002 | Itoh | F16C 33/64 476/46 |
| 2003/0169955 | A1 * | 9/2003 | Hirai | B32B 15/015 384/625 |
| 2003/0207773 | A1 * | 11/2003 | Lange | C10L 1/2383 508/234 |
| 2004/0003680 | A1 * | 1/2004 | Wasmund | B01J 8/22 75/362 |
| 2006/0058152 | A1 * | 3/2006 | Uchiyama | C23C 28/028 476/42 |
| 2007/0014863 | A1 * | 1/2007 | Yamaguchi | A61K 47/02 424/489 |
| 2007/0093397 | A1 * | 4/2007 | Patel | C10M 159/123 508/363 |
| 2007/0155635 | A1 * | 7/2007 | Tagawa | C10M 171/008 508/463 |
| 2007/0193935 | A1 * | 8/2007 | Elsenbaumer | C10M 137/10 210/209 |
| 2007/0214827 | A1 | 9/2007 | Venkatasubramaniam | |

(56) References Cited

U.S. PATENT DOCUMENTS

| | | | |
|---|---|---|---|
| 2007/0254087 A1* | 11/2007 | Suzuki | C09D 4/00 426/602 |
| 2007/0257229 A1* | 11/2007 | Tagawa | C10M 169/04 252/67 |
| 2007/0287644 A1* | 12/2007 | Mitsui | C10M 169/048 508/421 |
| 2008/0249246 A1* | 10/2008 | Okada | F16J 15/14 525/221 |
| 2009/0148654 A1* | 6/2009 | Brown | C08G 18/8087 428/96 |
| 2009/0269532 A1* | 10/2009 | Ferreiro | B32B 27/18 428/36.91 |
| 2010/0080986 A1* | 4/2010 | Iijima | C09D 183/06 428/336 |
| 2010/0183531 A1* | 7/2010 | Johncock | A61K 8/44 424/60 |
| 2010/0210745 A1* | 8/2010 | McDaniel | C09D 7/63 521/55 |
| 2010/0273909 A1* | 10/2010 | Ogawa | C08G 18/672 522/90 |
| 2010/0286003 A1* | 11/2010 | Al-Ahmad | C10M 151/02 508/185 |
| 2011/0120175 A1 | 5/2011 | Kamishima et al. | |
| 2012/0024007 A1* | 2/2012 | Ota | C09K 5/045 62/468 |
| 2013/0189516 A1* | 7/2013 | Sugino | C08J 7/04 428/339 |
| 2013/0225470 A1* | 8/2013 | Allen | C07C 69/593 510/382 |
| 2013/0277961 A1* | 10/2013 | Goto | F16L 58/182 285/94 |
| 2013/0295268 A1* | 11/2013 | Day | C11D 9/26 426/603 |
| 2013/0344012 A1* | 12/2013 | Cohen | C10G 3/42 424/59 |
| 2014/0144620 A1* | 5/2014 | Zaiser | E21B 17/00 166/242.1 |
| 2014/0165626 A1 | 6/2014 | Van Horn et al. | |
| 2014/0221258 A1* | 8/2014 | Ohler | C07C 5/03 508/110 |
| 2014/0360210 A1 | 12/2014 | Lapp et al. | |
| 2015/0017524 A1* | 1/2015 | Lee | H01M 4/62 429/212 |
| 2015/0083417 A1* | 3/2015 | Lant | E21B 43/26 166/279 |
| 2015/0087724 A1* | 3/2015 | Allen | C07C 309/10 514/772 |
| 2015/0093597 A1* | 4/2015 | Yerushalmi | C01G 23/07 428/702 |
| 2015/0191622 A1* | 7/2015 | Zhao | C09D 151/003 428/335 |
| 2015/0353800 A1 | 12/2015 | Kujak | |
| 2015/0377389 A1* | 12/2015 | Blondel | C08L 77/06 62/324.6 |
| 2016/0271921 A1* | 9/2016 | Berger | B32B 27/34 |
| 2016/0340602 A1* | 11/2016 | Erdemir | C10M 169/04 |
| 2017/0226442 A1* | 8/2017 | Sanson | C10M 107/34 |
| 2018/0073785 A1* | 3/2018 | Jonsson | F25B 31/008 |
| 2018/0156943 A1* | 6/2018 | Matsumoto | B32B 27/20 |
| 2018/0180332 A1* | 6/2018 | Opalka | C10M 107/24 |
| 2018/0201868 A1* | 7/2018 | Goto | F16L 15/04 |
| 2018/0230370 A1* | 8/2018 | Johnson | C09K 8/887 |

FOREIGN PATENT DOCUMENTS

| | | |
|---|---|---|
| CN | 103717716 A | 4/2014 |
| EP | 1231255 A1 | 8/2002 |
| WO | 2013085969 A1 | 6/2013 |
| WO | 2014117011 A1 | 7/2014 |
| WO | 2014117014 A2 | 7/2014 |
| WO | 2014158329 A1 | 10/2014 |
| WO | 2014158468 A1 | 10/2014 |
| WO | 2015037563 A1 | 3/2015 |

OTHER PUBLICATIONS

D.R. Pandy et al., "Innovative, Small, High-Speed Centrifugal Compressor Technologies," presented at the 1996 International Compressor Engineering conference at Purdue, Jul. 1996.

V.M. Sishtla, "Design and Testing of an Oil-Free Centrifugal Water-Cooled Chiller", International Conference on Compressors and their Systems: Sep. 13-15, 1999, City University, London, UK, conference transactions, The Institution of Mechanical Engineers, 1999, pp. 505-521.

M. W. Akram et al., Lubricity of environmentally friendly HFO-1234yf refrigerant, Tribology International Jan. 2013; 57:92-100. Doi: 10.1016/j.triboint.2012.07.01.

G. E Morales-Espejel at al., "Film thickness and traction measurements of refrigerant R1233zd used as lubricant in elastohydrodynamic conditions", Proc IMechE Part C: J Mechanical Engineering Science, 229(2) (2015) 244-253.

H. So, Surface Modification and Mechanisms, Chapter 3: "Metallic Tribo-oxides: Formation and Wear Behavior" Marcel Dekker, Inc., 2004, 31-57.

"Heating, Ventilating, and Air-Conditioning Systems and Equipment", 2004 Ashrae Handbook, pp. 34.12-34.13, American Society of Heating, Refrigerating and Air-Conditioning Engineers, Inc., Atlanta, Georgia.

International Search Report and Written Opinion dated Jun. 10, 2016 for PCT Patent Application No. PCT/US2016/024826.

H. So, Surface Modification and Mechanisms, Chapter 3: "Metallic Tribo-oxides: Formation and Wear Behavior" Marcel Dekker, Inc., 2004, 37-57.

C. Kajas, Surface Modification and Mechanisms, Chapter 6: "Tribo-chemistry" Marcel Dekker, Inc., 2004, 99-116, 101.

C. Kajas, Surface Modification and Mechanisms, Chapter 6: "Tribo-chemistry" Marcel Dekker, Inc., 2004, 116-126.

M. Furey & C. Kajas, Surface Modification and Mechanisms, Chapter 7: "Tribo-polymerization as a Mechanism of Boundary Lubrication", Marcel Dekker, Inc., 2004, 165-176.

Chinese Office Action dated Jul. 25, 2019 for Chinese Patent Application No. 201680020637.4.

Chinese Decision of Rejection dated Jan. 17, 2020 for Chinese Patent Application No. 201680020637.4.

European Office Action dated Jun. 2, 2020 for European Patent Application No. 16715729.6.

\* cited by examiner

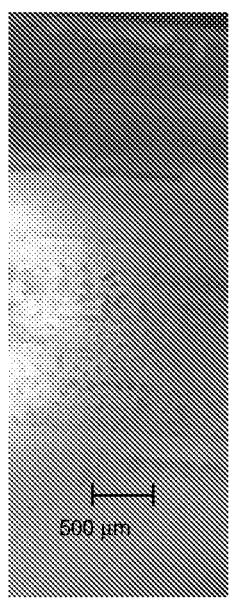 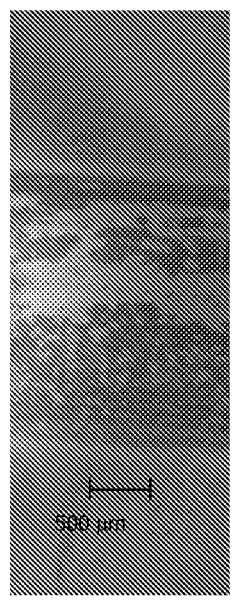 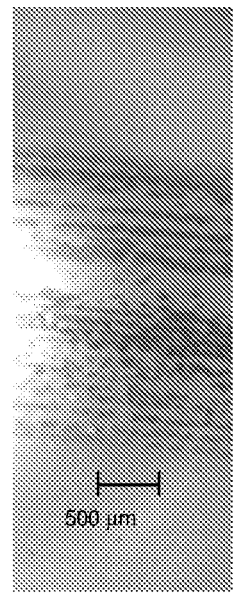
FIG. 4  FIG. 5  FIG. 6
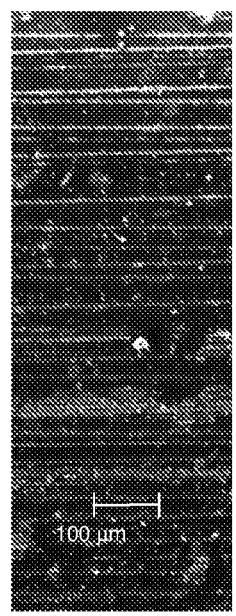 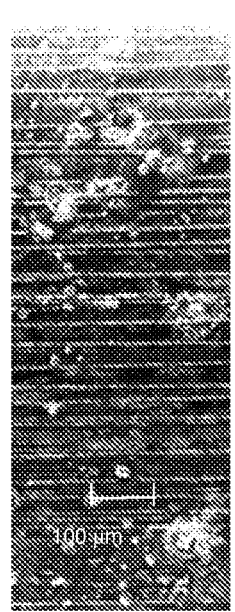 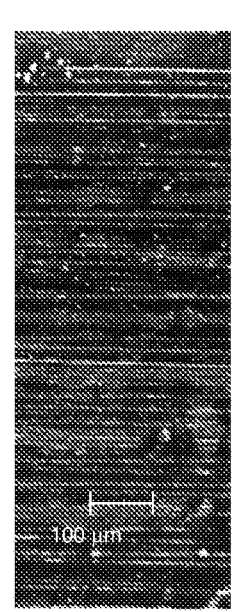
FIG. 4A  FIG. 5A  FIG. 6A

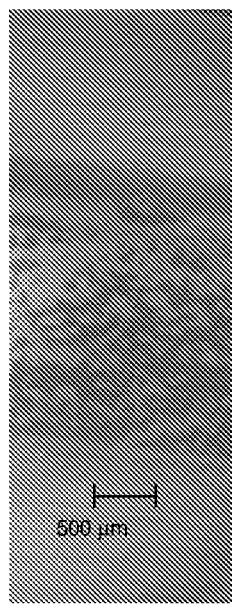 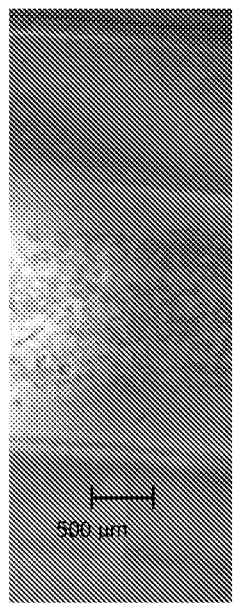 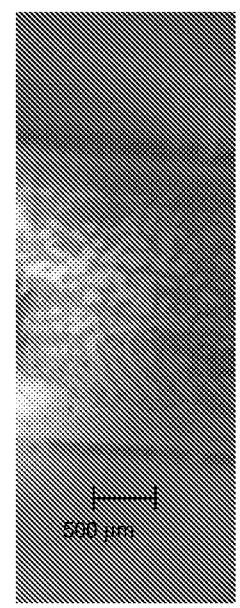
FIG. 7  FIG. 8  FIG. 9
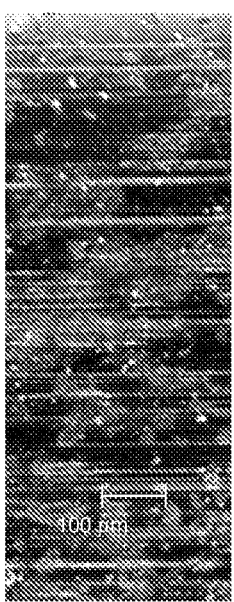 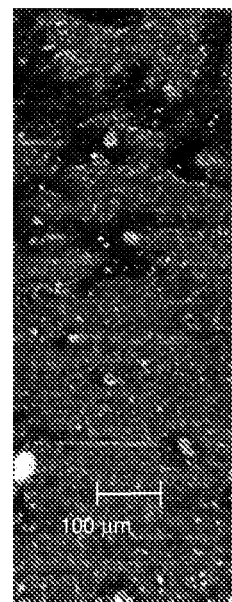 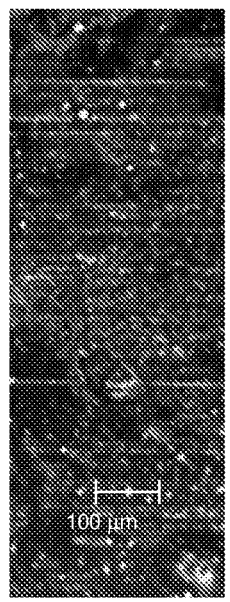
FIG. 7A  FIG. 8A  FIG. 9A

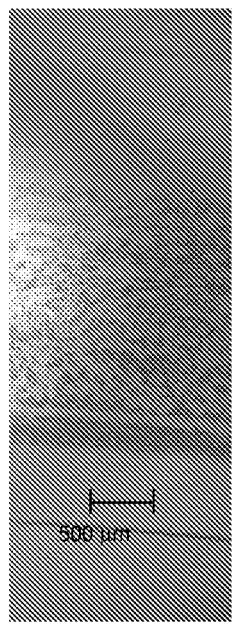 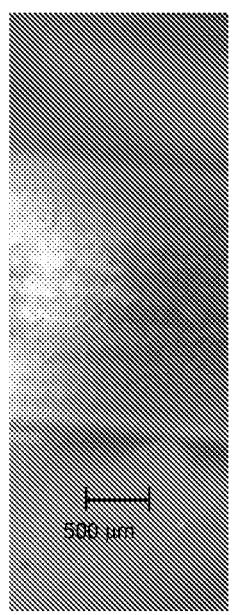 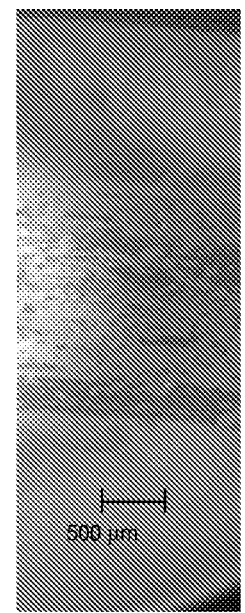
FIG. 10  FIG. 11  FIG. 12
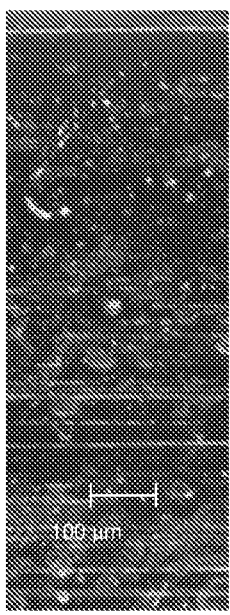 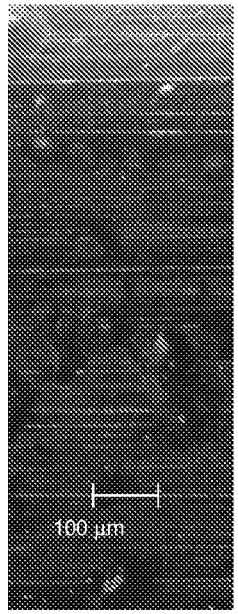 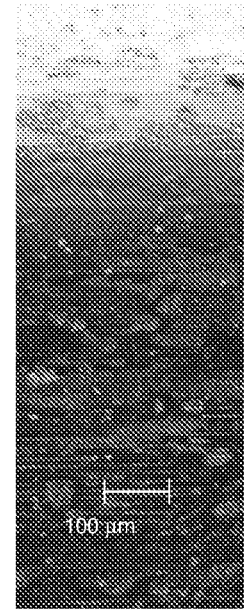
FIG. 10A  FIG. 11A  FIG. 12A

LOW-OIL REFRIGERANTS AND VAPOR COMPRESSION SYSTEMS

CROSS-REFERENCE TO RELATED APPLICATION

Benefit is claimed of U.S. Patent Application No. 62/140,086, filed Mar. 30, 2015, and entitled "Low-Oil Refrigerants and Vapor Compression Systems", the disclosure of which is incorporated by reference herein in its entirety as if set forth at length.

BACKGROUND

The disclosure relates to compressor lubrication. More particularly, the disclosure relates to centrifugal compressor lubrication.

A typical centrifugal chiller operates with levels of lubricant at key locations in flowing refrigerant. The presence of an oil reservoir, typically with more than a kilogram of oil will cause an overall content of oil to exceed 1.0 percent by weight when the oil accumulation in the reservoir is added to the numerator and denominator of the fraction. The concentration will be relatively low in the condenser (e.g., 50 ppm to 500 ppm). At other locations, the concentrations will be higher. For example the oil sump may have 60+ percent oil. This oil-rich portion is used to lubricate bearings. Thus, flow to the bearings will typically be well over 50 percent oil. At one or more locations in the system, strainers, stills, or other means may be used to withdraw oil and return it to a reservoir. It is desirable to remove the oil from locations where it may interfere with heat transfer or other operations.

There has for a long time existed a desire to operate chiller compressors and other rotating machinery and pumps without the need for a dedicated oil system. David C. Brondum, D. C., James E. Materne, J. E., Biancardi, F. R., and Pandy, D. R., "High-Speed, Direct-Drive Centrifugal Compressors for Commercial HVAC Systems," presented at the 1998 International Compressor Conference at Purdue, 1998; Pandy, D. R. and Brondum, D., "Innovative, Small, High-Speed Centrifugal Compressor Technologies," presented at the 1996 International Compressor Engineering conference at Purdue, July, 1996; Sishtla, V. M., "Design and Testing of an Oil-Free Centrifugal Water-Cooled Chiller", International Conference on Compressors and their Systems: 13-15 Sep. 1999, City University, London, UK, conference transactions, The Institution of Mechanical Engineers, 1999, pp. 505-521. In these tests, ceramic balls were used as the rolling element.

Lapp et al., WO2013085969 discloses silicon nitride ceramic balls rolling on nitrogen alloy steel races. Although this has improved the life of the bearings, there are still concerns about long term reliability due to mild wear of the bearing surfaces caused by the interaction of the ball and the races.

SUMMARY

One aspect of the disclosure involves a vapor compression system having: a centrifugal compressor having an inlet and an outlet; and an electric motor (28) having a stator and a rotor. A plurality of bearings support the rotor. A refrigerant charge comprises a base refrigerant and one or more oils. The one or more oils are present at a total concentration of 80-5000 parts per million (ppm) by weight.

In one or more embodiments of the other embodiments, the compressor is a two-stage direct drive compressor.

In one or more embodiments of the other embodiments, the system further comprises: a condenser; an evaporator; a suction line along a flowpath between the evaporator and an inlet of a first stage of the compressor; a flowpath leg from a discharge of the first stage to a second stage inlet; and a discharge line along a flowpath between a discharge of the second stage and an inlet of the condenser.

In one or more embodiments of the other embodiments, the system lacks an oil separator and an oil reservoir.

In one or more embodiments of the other embodiments, the charge is at least 95% by weight said base refrigerant.

In one or more embodiments of the other embodiments, the plurality of bearings comprise rolling element bearings.

In one or more embodiments of the other embodiments, the base refrigerant is one or more hydrofluoroolefins, hydrochloroolefins, and/or hydrochlorofluoroolefins.

In one or more embodiments of the other embodiments, the base refrigerant is trans 1-chloro, 3,3,3-fluoropropene (R1233zd(E)).

In one or more embodiments of the other embodiments, the one or more oils comprises one or more hydrocarbons.

In one or more embodiments of the other embodiments, the one or more oils is one or more polyol esters (POE), polyalkylene glycols (PAG), polyvinyl ethers (PVE), alkylbenzenes, polyalphaolefins, and/or mineral oils.

In one or more embodiments of the other embodiments, the oil is a hindered polyol ester formed from the condensation reaction of polyhydric alcohols with medium molecular weight (C5-C10) monohydric fatty acids.

In one or more embodiments of the other embodiments, the refrigerant consists essentially of the base refrigerant and the one or more oils.

In one or more embodiments of the other embodiments, the refrigerant has no more than 200 ppm each of all additional constituents beyond the base refrigerant, the one or more oils, and water.

In one or more embodiments of the other embodiments, the one or more oils is present at a concentration of 300-700 ppm by weight (or 200-3000 ppm, 200-1500 ppm, 300-1500 ppm, among other potential combinations.). The oil may be present as a single oil at said concentration or a subgroup of oils (e.g., a single polyol ester or a plurality of polyol esters).

In one or more embodiments of the other embodiments, the refrigerant comprises 50-200 ppm by weight water contaminant.

In one or more embodiments of the other embodiments, the system lacks an oil separator and oil reservoir.

In one or more embodiments of the other embodiments, a method for using the system comprises: passing to the bearings a lubricating flow of refrigerant with the one or more oils present at a concentration of 80-5000 parts per million (ppm) by weight.

In one or more embodiments of the other embodiments, the flow is at least 95% by weight said base refrigerant.

Another aspect of the disclosure involves a method for operating a vapor compression system. The vapor compression system comprises: a centrifugal compressor having an inlet and an outlet; and an electric motor having a stator and a rotor. At least one impeller is coupled to the electric motor. A plurality of bearings support at least one of the rotor and the impeller. A refrigerant charge comprises a base refrigerant and an oil. The method comprises passing to the bearings a flow of refrigerant with the oil present at a concentration of 80-5000 parts per million (ppm) by weight.

In one or more embodiments of the other embodiments, the oil is a polyol ester.

In one or more embodiments of the other embodiments, the oil reacts to form a protective coating on the bearings.

In one or more embodiments of the other embodiments, the coating comprises a metal-halide based under layer and a carbonaceous polymer upper layer.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4 is a photomicrograph of a bearing race; FIG. 4A is an enlarged view of a portion of the photomicrograph of FIG. 4.

FIG. 5 is a photomicrograph of a bearing race; FIG. 5A is an enlarged view of a portion of the photomicrograph of FIG. 5.

FIG. 6 is a photomicrograph of a bearing race; FIG. 6A is an enlarged view of a portion of the photomicrograph of FIG. 6.

FIG. 7 is a photomicrograph of a bearing race; FIG. 7A is an enlarged view of a portion of the photomicrograph of FIG. 7.

FIG. 8 is a photomicrograph of a bearing race; FIG. 8A is an enlarged view of a portion of the photomicrograph of FIG. 8.

FIG. 9 is a photomicrograph of a bearing race; FIG. 9A is an enlarged view of a portion of the photomicrograph of FIG. 9.

FIG. 10 is a photomicrograph of a bearing race; FIG. 10A is an enlarged view of a portion of the photomicrograph of FIG. 10.

FIG. 11 is a photomicrograph of a bearing race; FIG. 11A is an enlarged view of a portion of the photomicrograph of FIG. 11.

FIG. 12 is a photomicrograph of a bearing race; FIG. 12A is an enlarged view of a portion of the photomicrograph of FIG. 12.

Like reference numbers and designations in the various drawings indicate like elements.

DETAILED DESCRIPTION

Figure 1:
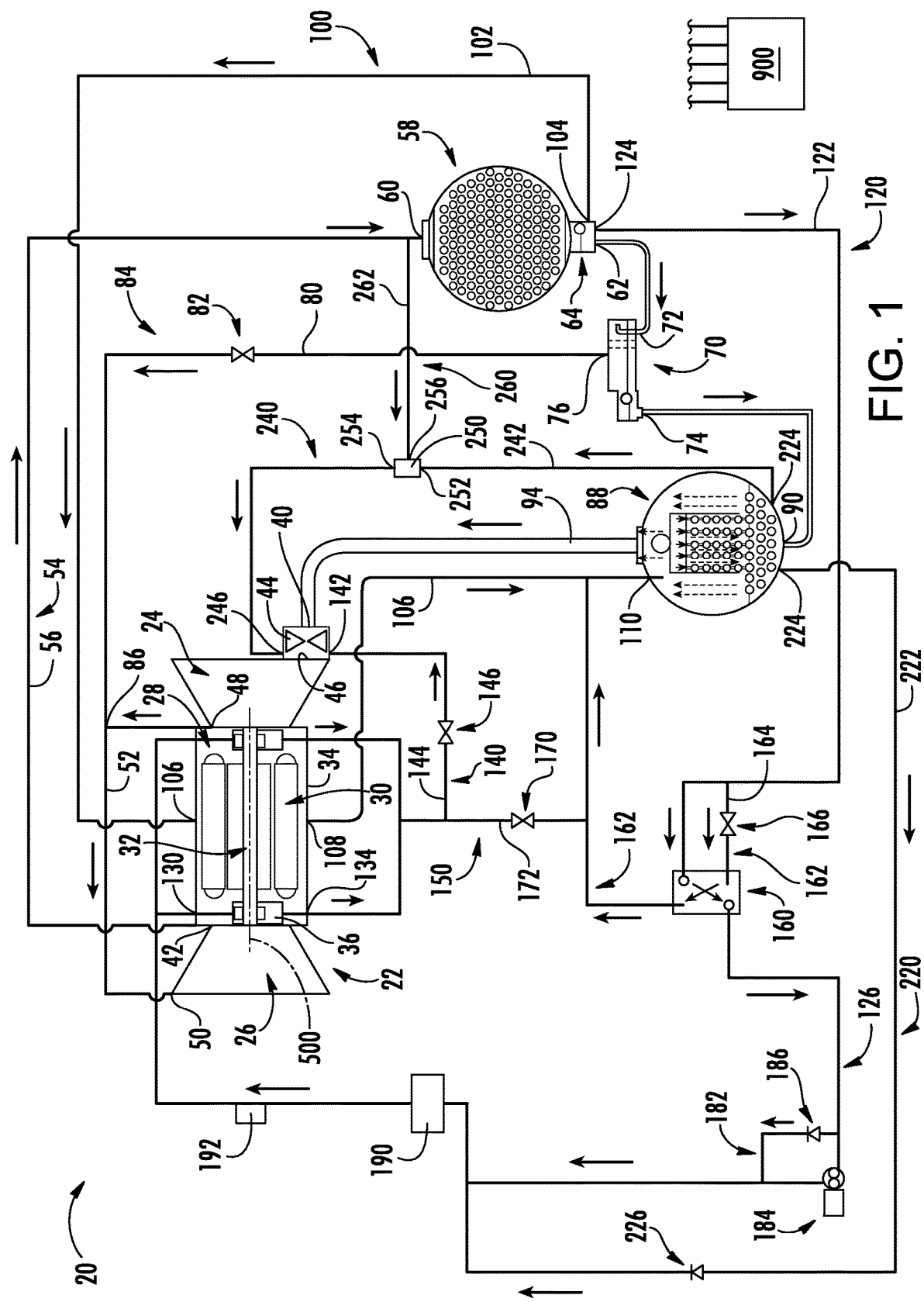
FIG. 1 is a schematic view of a vapor compression system in a first mode of operation.

FIG. 1 shows a vapor compression system 20. FIG. 1 shows flow arrows (and thus associated valve conditions) associated with operating conditions that may correspond to a startup condition or, generally, a condition where there is a low pressure difference between condenser and evaporator. Other operating conditions are discussed further below. The exemplary system 20 is a chiller having a compressor 22 driving a recirculating flow of refrigerant. The exemplary compressor is a two-stage centrifugal compressor having a first stage 24 and a second stage 26. Impellers of the two stages are co-spooled and directly driven by an electric motor 28 having a stator 30 and a rotor 32. The compressor has a housing or case 34 supporting one or more bearings 36 to in turn support the rotor 32 for rotation about its central longitudinal axis 500 forming a central longitudinal axis of the compressor. As is discussed further below, the bearings are rolling element bearings with one or more circumferential arrays of rolling elements radially sandwiched between an inner race on the rotor (e.g., mounted to a shaft) and an outer race on the housing (e.g., press fit into a bearing compartment). Exemplary rolling elements include balls, straight rollers (e.g., including needles), and tapered rollers. Exemplary bearings are hybrid bearings with steel races and ceramic rolling elements. Exemplary ceramic rolling elements are silicon nitride ceramic balls. Exemplary races are 52100 bearing steel rings and high nitrogen CrMo martensitic steel rings, including Bohler N360 (trademark of BÖHLER Edelstahl GmbH & Co KG, Kapfenberg, Austria) and Cronidur 30 (trademark of Energietechnik Essen GmbH, Essen, Germany).

As is discussed further below, the exemplary vapor compression system 20 is an essentially oil or lubricant-free system. Accordingly, it omits various components of traditional oil systems such as dedicated oil pumps, oil separators, oil reservoirs, and the like. However, a very small amount of oil or other material that may typically be used as a lubricant may be included in the overall refrigerant charge to provide benefits that go well beyond the essentially non-existent amount of lubrication such material would be expected to provide. As is discussed further below, a small amount of material may react with bearing surfaces to form protective coatings. Accordingly, even though traditional oil-related components may be omitted, additional components may be present to provide refrigerant containing the small amounts of material to the bearings. In discussing this below, terms such as "oil-rich" may be used. Such terms are understood as used to designate conditions relative to other conditions within the present system. Thus, "oil-rich" as applied to a location in the FIG. 1 system may be regarded as extremely oil-depleted or oil-free in a traditional system.

The exemplary compressor has an overall inlet (inlet port or suction port) 40 and an overall outlet (outlet port or discharge port) 42. In the exemplary configuration, the outlet 42 is an outlet of the second stage 26. The inlet 40 is upstream of an inlet guide vane array 44 which is in turn upstream of the first stage inlet 46. The first stage outlet 48 is coupled to the second stage inlet 50 by an interstage line (interstage) 52. Although inlet guide vanes (IGVs) are shown only for the first stage, alternative implementations may additionally or alternatively have IGVs for the second stage. In such cases, the line 240 could go to the second stage. Another variation is a single stage compressor with inlet guide vanes.

As is discussed further below, additional flows of refrigerant may exit and/or enter the compressor at additional locations. From the discharge port 42, a main refrigerant flowpath 54 proceeds downstream in a normal operational mode along a discharge line 56 to a first heat exchanger 58. In the normal operational mode, the first heat exchanger is a heat rejection heat exchanger, namely a condenser. The exemplary condenser is a refrigerant-water heat exchanger wherein refrigerant passes over tubes of a tube bundle which carry a flow of water (or other liquid). The condenser 58 has one or more inlets and one or more outlets. An exemplary primary inlet is labeled 60. An exemplary primary outlet is labeled 62. An exemplary outlet 62 is an outlet of a sump 64 at the base of a vessel of the condenser 58. Additional sump outlets are shown and discussed below.

The exemplary system 20 is an economized system having an economizer 70 downstream of the condenser along the flowpath 54. The exemplary economizer is a flash tank economizer having an inlet 72, a liquid outlet 74, and a vapor outlet 76. In the exemplary implementation, the vapor outlet 76 is connected to an economizer line 80 defining an economizer flowpath 84 as a branch off the main flowpath 54 returning to an economizer port 86 of the compressor which may be at the interstage 52. A control valve 82 (e.g., an on-off solenoid valve may be along the economizer line. The main flowpath 54 proceeds downstream from the economizer liquid outlet 74 to an inlet 90 of a second heat exchanger 88. The exemplary heat exchanger 88 is, in the normal operational mode, a heat absorption heat exchanger (e.g., evaporator). In the exemplary chiller implementation, the evaporator 88 is a refrigerant-water heat exchanger which may have a vessel and tube bundle construction wherein the tube bundle carries the water or other liquid being cooled in the normal operational mode. For simplicity of illustration, FIG. 1 omits details including the inlet and outlet for the flows of water or other heat transfer fluid. The evaporator has a main outlet 92 connected to a suction line 94 which completes the main flowpath 54 returning to the inlet 40.

Several additional optional flowpaths and associated conduits and other hardware are shown branching off from and returning to the main flowpath 54. In addition to the economizer flowpath 84, a motor cooling flowpath 100 also branches off from and returns to the flowpath 54. The exemplary motor cooling flowpath 100 includes a line 102 extending from an upstream end at a port 104 on some component along the main flowpath (shown as the sump 64). The line 102 extends to a cooling port 106 on the compressor. The motor cooling flowpath passes through the port 106 into a motor case of the compressor. In the motor case, the cooling flow cools the stator and rotor and then exits a drain port 108. Along the flowpath 100, a motor cooling return line 106 returns from the port 108 to the main flowpath. In this example, it returns to a port 110 on the vessel of the evaporator 88.

A more complicated optional system of branch flowpaths may be associated with bearing lubrication. A trunk 120 of a bearing supply flowpath is formed by a line 122 extending from a port 124 located along the main flowpath (e.g., at the sump 64). A branch 126 ultimately passes to one or more ports 130 on the compressor communicating refrigerant to respective associated bearings 36. One or more ports 134 extend from one or more drains at the bearings to return refrigerant to the main flowpath. In this embodiment, two possible return paths are shown. A first return path or branch 140 passes to a port 142 immediately downstream of the inlet guide vane array 44. This port 142 is at essentially the lowest pressure condition in the system and thus provides the maximum suction for drawing refrigerant through the bearings. A valve 146 may be along a line 144 along this flowpath branch. The exemplary valve 146 is an electronically controlled on-off valve (e.g., a solenoid valve) under control of a system controller. A second bearing return flowpath/branch 150 is discussed below.

Several additional optional features relating to refrigerant supply to the bearing are shown. A subcooler 160 may be provided to cool refrigerant passing to the bearings. The exemplary subcooler 160 is a heat exchanger that receives flow passing along the flowpath 126 and transfers heat from that refrigerant flow to a refrigerant flow passing along a branch 162. The exemplary branch 162 branches off directly or indirectly from the main flowpath. In the illustrated embodiment, the branch 162 branches off from the flowpath 120 leaving the branch 126. In alternative implementations, the branch 162 may be fully separate from the flowpath 120.

The branch 162 passes through a subcooler supply line 164 in which an expansion device 166 (e.g., an expansion valve) is located. Expanded refrigerant enters a subcooler inlet of the subcooler 160 and exits a subcooler outlet. In the subcooler 160, the expanded refrigerant absorbs heat from refrigerant passing along the branch 126 which has entered a main inlet and then exits a main outlet. The exemplary subcooler 160 is a brazed plate heat exchanger. The flowpath 162 returns to the main flowpath. In the exemplary embodiment, the flowpath 162 merges with the flowpath 106 and enters the port 110 on the heat exchanger 88. Alternatively, line 164 can come directly from the condenser independently of line 122 and its associated flowpath.

As noted above, FIG. 1 also shows a second bearing drain flowpath branch 150. The exemplary flowpath branch 150 joins the flowpath 162 downstream of the subcooler and upstream of the junction with the line 106. A valve 170 (e.g., similar to 146) is located in a line 172 along the flowpath 150 to control flow. In an exemplary FIG. 1 condition, the valve 170 is closed blocking flow along the branch 150.

FIG. 1 shows further details of exemplary flowpath 126. The flowpath 126 further branches into a branch 180 and a parallel branch 182 which then remerge. A pump 184 is located along the branch 180 and a one-way check valve 186 located along the branch 182. In the normal FIG. 1 operating condition, pressure is sufficient to drive flow downstream through the valve 186. Accordingly, the pump 184 is not used. If pressure is insufficient (discussed below) the pump 184 may be turned on to drive refrigerant flow for bearing supply.

The flowpath 126 proceeds downstream through a filter 190 prior to entering the ports 130. FIG. 1 also shows a temperature sensor 192 downstream of the filter 190 for measuring temperature of refrigerant entering the compressor for bearing cooling.

FIG. 1 further shows yet another branch 220 for bearing cooling. The exemplary branch 220 bypasses both the optional subcooler and the pump before rejoining the branch 126 upstream of the filter 90. The exemplary branch 220 passes along a line 222 extending from a port 224 on the evaporator and passes through a check valve 226 which may be similar to the check valve 186.

FIG. 1 further shows a bypass flowpath or branch 240 for returning refrigerant to the compressor. A line 242 is along the flowpath from an upstream end at a port 244 on the evaporator to a downstream end at a port 246 in similar location to the port 142 downstream of the inlet guide vane array 144. This may be used to deliver a relative oil-rich flow of refrigerant back to the compressor. Specifically, oil may tend to concentrate in liquid refrigerant in a lower portion of the evaporator. Because the port 244 may be positioned at such a location to deliver oil-rich refrigerant directly to the bearings, flow along the flowpath 240 gets the oil into the compressing flow which, in turn, passes to the condenser 58 and may thus increase the amount of oil available in the flow along the flowpath 120. Pressure difference between the ports 244 and 246 alone may be insufficient to drive this flow. Accordingly, an eductor 250 or similar pump may be located along the line 242. The eductor has a suction port or inlet 252 upstream and a discharge port or outlet 254 downstream. A motive flow inlet 256 receives flow along a branch flowpath 260 associated with a branch line 262. The exemplary branch line 262 and flowpath 260 branch off the main flowpath at essentially compressor discharge conditions (e.g., from upstream of the condenser inlet 60 or from the headspace of the condenser).

Figure 2:
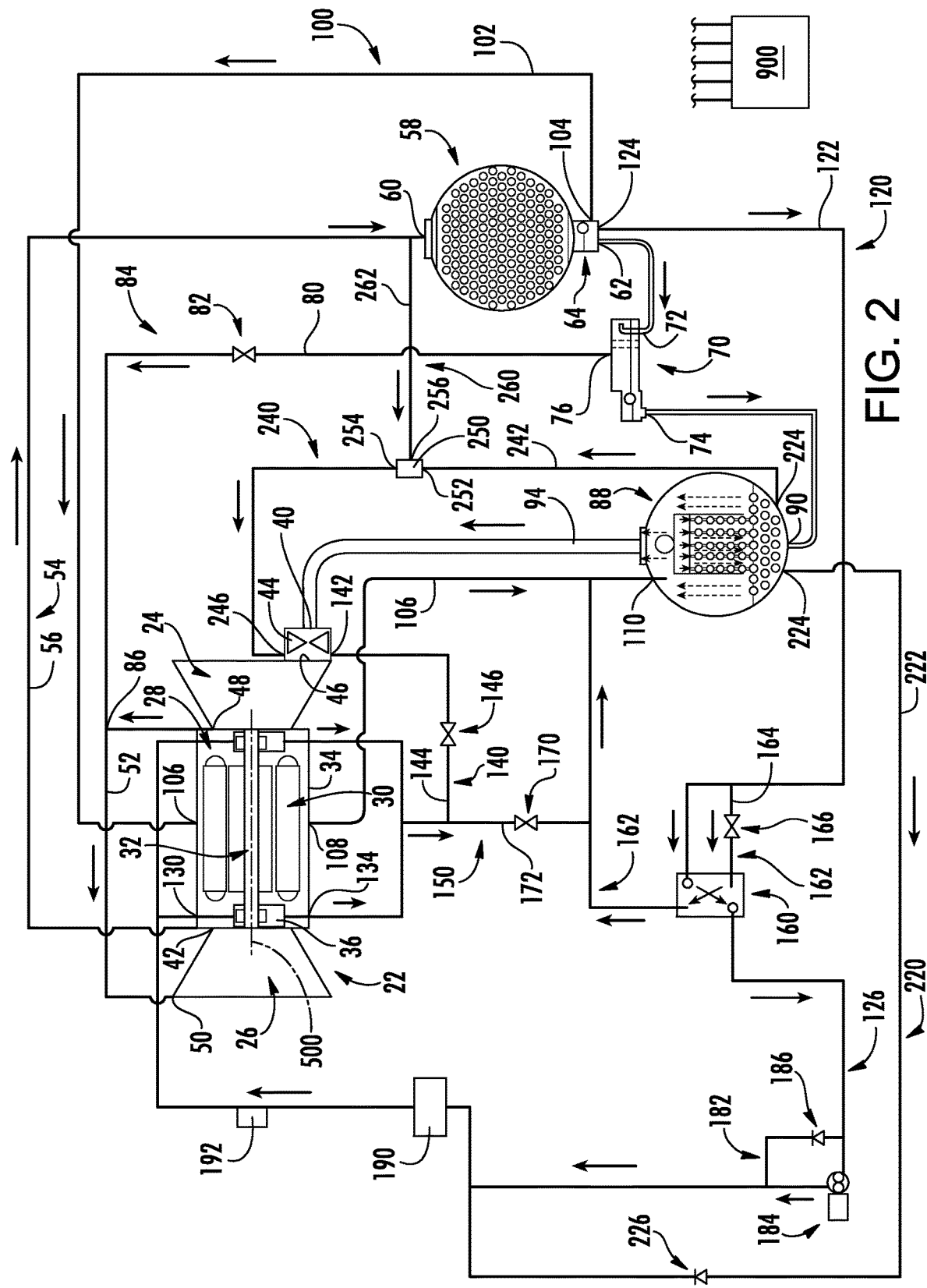
FIG. 2 is a schematic view of the system in a second mode of operation.

FIG. 2 shows flow arrows associated with a normal operational mode (e.g., with high pressure difference between condenser and evaporator). Yet other modes are possible and may be dependent upon other system details or modifications thereof (e.g., a defrost mode where one heat exchanger is a refrigerant-air heat exchanger or possible other modes where the functions of the two heat exchangers become reversed).

The overall circulating refrigerant mixture comprises: one or more base refrigerants or refrigerant bases (e.g., discussed below); a small amount of an oil material that might normally be regarded as a lubricant; optionally, further additives; and contaminants, if any.

Exemplary base refrigerant can include one or more hydrofluoroolefins, hydrochloroolefins, and mixtures thereof (e.g., including hydrochloroflouroolefins). Below HFO is used to synonymously refer to all three of these refrigerant types. Exemplary hydrochloroflouroolefins include chloro-trifluoropropenes. Exemplary chloro-trifluoropropenes, are 1-chloro-3,3,3-trifluoropropene and/or 2-chloro-3,3,3-trifluoropropene, and most particularly trans-1-chloro-3,3,3-trifluoropropene (E-HFO-1233zd, alternatively identified as R1233zd(E)). The hydrofluoroolefins can be a C3 hydrofluoroolefin containing at least one fluorine atom, at least one hydrogen atom and at least one alkene linkage. Exemplary hydrofluoroolefins include 3,3,3-trifluoropropene (HFO-1234zf), E-1,3,3,3-tetrafluoropropene, (E-HFO-1234ze), Z-1,3,3,3-tetrafluoropropene (Z-HFO-1234ze), 2,3,3,3-tetrafluoropropene (HFO-1234yf), E-1,2,3, 3,3-pentafluoropropene (E-HFO-1255ye), Z-1,2,3,3,3-pentafluoropropene (Z-HFO-125ye).

Exemplary oils are polyol ester (POE) oils. Other possible oils include polyalkylene glycols (PAG), polyvinyl ethers (PVE), alkylbenzenes, polyalpha olefins, mineral oils, and the like as well as mixtures. A relevant consideration is the availability of hydrocarbons that can form an organic protective layer.

The trace polyol ester oil (100 ppm) may particularly be of the hindered type excellent in thermal stability. The polyol ester oil is obtained from the condensation reaction between polyhydric alcohols and monohydric fatty acids (e.g., medium molecular weight (C5-C10)). Particular examples of polyhydric alcohols include neopentyl glycol, trimethylolethane, trimethylolpropane, trimethylolbutane, pentaerythritol, dipentaerythritol, and higher polyether oligomers of pentaerythritol, such as tripentaerythritol and tetrapentaerythritol. Polyol esters can be formed from monohydric fatty acids including n-pentanoic acid, n-hexanoic acid, n-heptanoic acid, n-octanoic acid, 2-methylbutanoicacid, 2-methylpentanoic acid, 2-methylhexanoic acid, 2-ethylhexanoic acid, isooctanoic acid, 3,5,5-trimethylhexanoic acid.

The additives may comprise a wide range of functionalities, including: extreme pressure agents; acid capturing agents; defoamers; surfactants; antioxidants;

corrosion-inhibitors; plasticizers; metal deactivating agents. These may comprise a wide range or chemistries including: epoxides; unsaturated hydrocarbons or unsaturated halocarbons; phthalates; phenols; phosphates; perfluoropolyethers; thiols; phosphites; siloxanes; tolytriazoles; benzotriazoles; amines; zinc dithiophosphates; and amine/phosphate ester salts. Exemplary individual additive concentrations are no more than 1.0% by weight, more particularly 10 ppm to 5000 ppm or no more than 1000 ppm or no more than 200 ppm. Exemplary aggregate non-oil additive concentrations are no more than 5.0% by weight, more particularly, no more than 2.0% or no more than 1.0% or no more than 5000 ppm or no more than 1000 ppm or no more than 500 ppm or no more than 200 ppm or no more than 100 ppm.

Figure 3:
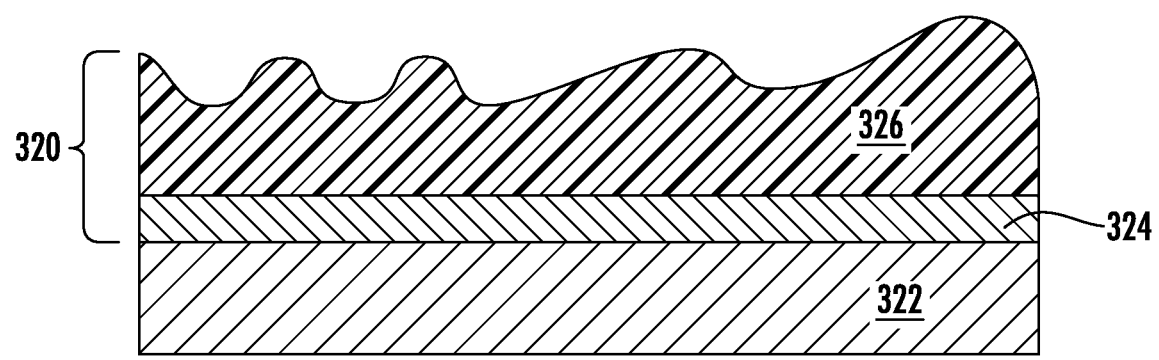
FIG. 3 is a schematic sectional view of a protective layer atop a bearing race substrate.

FIG. 3 is a schematic representation of the believed protective coating 320 atop the substrate 322 of a bearing race. The coating 320 is believed to include a generally metal halide/oxide sublayer 324 atop the substrate (discussed below) and a polymer layer 326 atop the layer 324. Here, halide refers to both fluorides and chlorides. The exemplary R1233zd refrigerant molecules serve as a source of chlorine and fluorine for forming metal chloride and metal fluoride reaction products in the sublayer 324, respectively. The R1233zd molecules also serve as a source for fluorocarbon repeating units in the carbonaceous polymer layer 326. The oil provides a source of further components for the carbonaceous polymer layer 326.

The refrigerant, oils, additives, and/or contaminants can decompose and react under the high pressure (often greater than 1 GPa) and temperature (locally rising to 350° F. (177° C.) or higher) tribological conditions in the bearing contact. These reactions are initiated by mechanical shear of the fluid chemical species interacting with the surfaces, the deformation of asperities, and the exposure of reactive, native metal surfaces in locally occurring boundary or mixed-lubrication regimes. These tribological processes lead to the ejection of low-energy exo-electrons from the contact surfaces. Trace contaminants such as water and oxygen (e.g., up to 100 ppm) may be present. Small amounts of these may assist in the reactions that form the protective layer on the bearings and, thus, be of benefit. These exo-electrons can react with $O_2$ and $H_2O$ contaminants, even at ppm levels, to form $O^-$ and $OH^-$ anions or radicals, respectively, that are active agents for the initiation of tribochemical reactions leading to metal oxidation/hydroxylation and HFO refrigerant decomposition. The presence of $O_2$ and $H_2O$ contaminants at too high levels are not desired, because they can lead to detrimental metal corrosion and attack. See, Surface Modification and Mechanisms, Chapter 6: "Tribo-chemistry" C. Kajas, Marcel Dekker, Inc., 2004, 99-116, 101.

The HFO refrigerants alone have some capacity to form a protective film. For example, the double bond of R1233zd molecules strongly adsorb on metal and metal oxide surfaces. These interacting R1233zd decompose and react with these surfaces to form very stable metal halides (primarily fluorides, some chlorides) and less stable $C-F_x$ molecular layer(s) in the wear track. See, M. W. Akram, et al., Lubricity of environmentally friendly HFO-1234yf refrigerant, Tribology International January 2013; 57:92-100. DOI: 10.1016/j.triboint.2012.07.013.

In addition, the R1233zd double bonds can undergo addition reactions with each other to form oligomers or low molecular weight polymers, leading to the formation of a solid deposit. See, G. E. Morales-Espejel, R. Meeuwenoord, A. F. Quiñonez and R. Hauleitner, Film thickness and traction measurements of refrigerant R1233zd used as lubricant in elastohydrodynamic conditions, Proc IMechE Part C: J Mechanical Engineering Science, 229(2) (2015) 244-253. However, the polymer film formed from R1233zd alone, in the absence of organic additives, is not highly reacted and is weakly bound to the surface.

Metal oxide & fluoride formation reaches a critical layer thickness (e.g., a few nanometers). The process is diffusion limited. Metal oxides, and especially metal fluorides (the Fe—F bond is very strong) are believed to form the first protective tribo-layer 324. See, H. So, Surface Modification and Mechanisms, Chapter 3: "Metallic Tribo-oxides: Formation and Wear Behavior" Marcel Dekker, Inc., 2004, 31-57.

The polar functional groups of some lubricant oils, such as polyol ester (POE) oil molecules, can strongly adsorb on the surface to form a boundary film. The POE functional groups play a protective role in preventing surface corrosive attack from excessive $H_2O$ and $O_2$ contaminant concentrations, and also, contribute to the growth of wear-protective films. The ejected tribo-electrons initiate co-reactions of the POE side groups with the HFO refrigerants, such as R1233zd, form to a strong, high molecular weight carbonaceous polymer film on top of metal fluorides and oxides. These reactions involve very small concentrations of the polar oils and are not diffusion-limited. The branched POE molecular structure incorporated in the polymer serves as effective cross-links that strengthen the polymer film. See, C. Kajas, Surface Modification and Mechanisms, Chapter 6: "Tribo-chemistry" Marcel Dekker, Inc., 2004, 116-126; M. Furey & C. Kajas, Surface Modification and Mechanisms, Chapter 7: "Tribo-polymerization as a Mechanism of Boundary Lubrication", Marcel Dekker, Inc., 2004, 165-176; Akram, et al., Tribological performance of environmentally friendly refrigerant HFO-1234yf under starved lubricated conditions, Wear, 304 (2013) 191-201.

Because HFO refrigerants and lubricating oils are strong solvents for a number of other species, the above described reactions can also inadvertently incorporate other additives and contaminants entrained in the refrigerant fluid.

Accordingly, a film coating 320 (FIG. 3) with two or more layers is formed on the race surfaces from the reaction of HFO refrigerants with trace lubricating oils. The coating provides wear and corrosion protection. An inner, thin, protective reaction product layer 324 containing mixed metal oxides and halides (fluorides and chlorides) strongly bound to the bearing surfaces. This hard layer prevents surface wear from mechanical deformation and corrosive attack. This layer serves as a foundation layer for creating and stabilizing the outer layer. The outer organic polymeric oxy-hydrofluorocarbon layer 326 is strong enough to support elasto-hydrodynamic film formation, and protects the underlying metal oxide/halide layer. The formation of this polymer film is self-limiting. This layer can undergo local deformation in the boundary regime, and self-heal any breaks in film attrited during wear.

With the POE, the predominant bearing wear occurs during the first ~25 hours of run-in and stabilizes within the first 200-300 hrs. The bearing surface burnishes early in the life of the bearing and has not shown significant changes over bearing life, or, with stop/start cycling A number of hybrid bearing test runs were made in laboratory-scale "clean rigs". These rigs were extensively cleaned to minimize nonvolatile residues prior to each test run. This was done by ultrasonically cleaning the parts successively in acetone, isopropanol, and ethanol. This was followed by at least four flushes with R1233zd(E) refrigerant added as a vapor phase to the rig after it was fully assembled. Post-test analyses of the refrigerant fluid were conducted by evaporating a 100 g sample and weighing the sample container to within 0.1 mg resolution. The analyses indicated nonvolatile residues (e.g., silicones, epoxies, residual assembly lubricant, and the like) of less than 10 ppm. This residue is believed to originate collectively from extractions of organic components on the bearing cages, valves in the refrigerant tanks originating from residual metal working fluids used for tank fabrication, and from valve lubricants used by the refrigerant thank manufacturer. Another possible source are nonvolatiles carried as minute droplets from the supplied refrigerant.

Analysis of the liquid refrigerant as delivered from the supplier indicated nonvolatiles in the 18-60 ppm range and in addition to that, a water content typically below 10 ppm. By introducing the refrigerant to the test rig in the vapor phase, the as-supplied nonvolatiles (but not the water) were excluded from the rig. In actual chiller manufacture and service, refrigerant may be added in the liquid phase and thus may add the as-supplied nonvolatiles to whatever residues may originate in chiller hardware.

The clean rig test results are shown in the following example. As exemplary baselines, FIGS. 4 and 5 show photographs of bearing race surfaces after runs of one hundred hours with R1233zd(E) refrigerant without added oil and respective water contents of less than 10 ppm (e.g., the residual water content of about 5-9 ppm (exemplary standards for as-received refrigerant may be higher such as up to 30 ppm) within normal refrigerant that amounts to essentially water-free) and about 100 ppm (about 100 ppm added to whatever was residual), respectively. FIG. 4A is an enlarged view of a portion of FIG. 4. FIG. 5A is an enlarged view of a portion of FIG. 5. In these photographs, the wear tracks formed in the ball-race mechanical contact region are evident as a horizontal band in the main views; whereas the wear track features are resolved in the enlarged views.

A number of FIGS. 5-13, show the bearing race surfaces after 100 hour runs with different refrigerant-additive conditions. FIG. 5A shows extensive corrosion pitting with rust deposits at the pit bottoms. FIG. 4A does not show corrosion pitting. By way of contrast, FIGS. 6 and 6A show a similar run, but with only residual water and 1117 ppm total of polyol ester and residual nonvolatiles. Rather than pitting, the dark features along the bearing path are part of a tribochemical coating buildup that protects the underlying bearing surface. The tribochemical coating in FIG. 6A is much more significant than that observed in FIG. 4A. Such a coating is viewed in several alternative combinations of water and polyol ester content.

FIGS. 7 and 7A show a situation of 100 ppm water and 1240 ppm polyol ester and residual nonvolatiles. The oil eliminates the pitting that was observed in FIGS. 5 and 5A with a similar water content. It is thus observed that this amount of polyol ester protects against the pitting observed with water alone.

FIGS. 8 and 8A show a situation of 461 ppm polyol ester and residual nonvolatiles and only residual water. Again, the protective tribochemical layer is seen at this intermediate oil concentration.

FIGS. 9 and 9A show a situation of 100 ppm polyol ester and residual nonvolatiles and only residual water. The protective tribochemical layer is also seen at this low oil concentration.

FIGS. 10 and 10A show a situation of 1223 ppm polyol ester and residual nonvolatiles, 100 ppm air (intentionally added for experimental purposes), and only residual water. Again, the protective tribochemical layer is seen.

FIGS. 11 and 11A show a situation involving 100 ppm polyol ester and residual nonvolatiles, only residual water, and copper. The copper was introduced by placing a fine copper mesh in the flow of the refrigerant delivered to the bearings. The test rigs generally had stainless steel components; whereas in actual chillers the refrigerant is exposed to copper in liquid lines and heat-exchangers. Such copper in chillers may act as a catalyst and promote reactions in the refrigerant and the oil. The high surface area of the mesh simulates large scale use of copper chiller components. The copper did not appear to influence the formation of the tribochemical layer one way or another. Again, the protective tribochemical layer is seen.

FIGS. 12 and 12A show a situation of 1081 ppm mineral oil and residual nonvolatiles as an alternative to polyol ester in an only residual water and air situation. In this case, a tribochemical layer was also formed.

Figure 13:
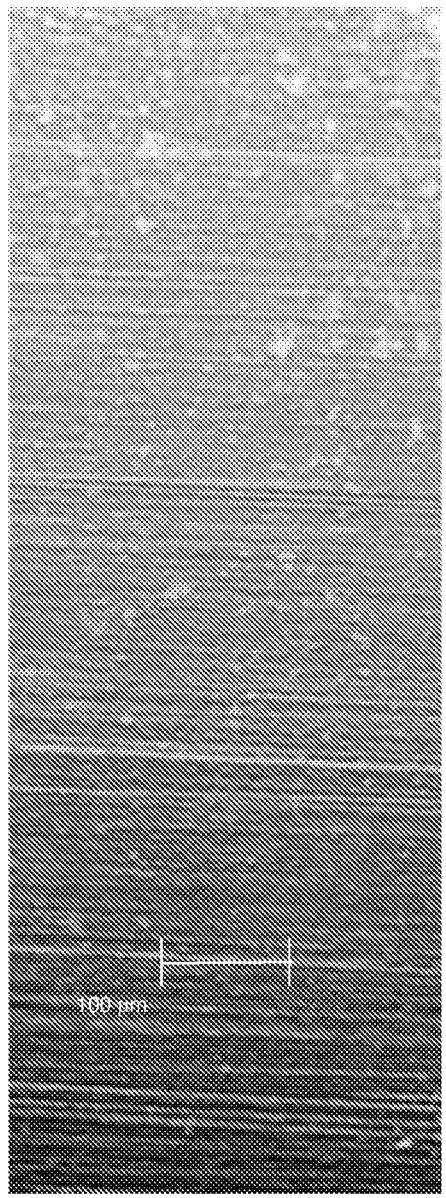
FIG. 13 is a photomicrograph of a bearing race.

FIG. 13 shows the use of 1532 ppm polyol ester and residual nonvolatiles in a water-free and air-free test on a separate test rig from that used for the other tests, after 136 hours. In this, it is seen that the protective tribochemical layer was also formed.

Tests have shown a general stability over anticipated service lives of bearings. Accordingly, there does not appear to be a need to replenish the small amount of the one or more oils. However, possible replenishment may be made. Accordingly, a good estimate of a range of initial total oil concentration is 80-5000 ppm. The oil content may then diminish over the service life. More narrow lower limits on the range may be 100 ppm or 200 ppm or 300 ppm or 400 ppm or 500 ppm. More narrow upper limits on the range may be 700 ppm or 1000 ppm or 1500 ppm or 3000 ppm. These lower and upper limits may be used in any possible combination. Although the exemplary one or more oils is essentially only polyol ester (e.g., with residual amounts, if any, of other oil(s)), alternatives may involve more substantial mixtures. The ranges may thus be applied simultaneously both to total oil concentration and to concentration of a single oil within a possible mixture.

Whereas some actual or hypothetical oil-lubricated compressors may have local oil concentrations in this range due to various flow separations, those systems may be distinguished in several ways. First, in the exemplary system, essentially the entire amount of oil may be in solution. This is distinguished from situations where the oil lubricant is a separate phase/body (e.g., in a reservoir or other location). Additionally, amongst key locations, exemplary flows introduced to the present bearings may be within the ranges above or within some multiple of those ranges (e.g., up to ten times, more narrowly, up to four times). Exemplary base refrigerant content of the total is thus at least 95% by weight or at least 98% or at least 99% (with yet higher numbers associates with lower oil and/or additive contents noted above). This is in contrast with a traditional lubricant system wherein the flow delivered to bearings may comprise well in excess of 10% lubricant, often in excess of 30% or in excess of 50%, typically 60% to 95% of oil. Further in the exemplary system, the addition of the POE does not significantly change the viscosity and pressure-viscosity coefficient of the refrigerant (relative to the pure base refrigerant) delivered to cool/lubricate the bearings. The oil merely serves the purpose of a co-reactant with the base refrigerant facilitating the formation of a protective tribological film at the bearing surface without significantly affecting the elasto-hydrodynamic film thickness.

Compared with alternative true oil-free systems, advantages may lie in enhanced bearing life and/or reduced bearing specifications and costs. The compressor may be run for periods in excess of 100000 hours or in excess of 200000 hours with the exemplary oil concentrations without change of refrigerant or replenishment of oil. This may comprehend a compressor service life of at least 10 years or at least 20 years without recharge (and thus without bearing replacement). Thus, these operational periods would also exceed 1000 hours, 2000 hours, and 5000 hours. Relative to alternative compressors having traditional lubrication, advantages may include reduced costs of equipment due to elimination of separators, oil pumps, oil reservoirs, and the like as well as associated maintenance costs. Additionally, efficiency may be improved by not having the oil interfere with the vapor compression cycle.

The enhanced protection against water-induced corrosion may allow greater tolerance of water than in other oil-free refrigerant-lubricated systems. Exemplary water content may be no more than 1000 ppm by weight or no more than 500 ppm or no more than 300 ppm or no more than 200 ppm or an exemplary 20-300 ppm or 50-200 ppm. These high contents (or yet greater contents) may not be desired and may not be initial contents, but may arise over the service life. R1233zd(E) is a low pressure refrigerant, thus having increased susceptibility to infiltration of atmospheric water (whereas, with medium pressure refrigerants the more significant problem is leakage of refrigerant). Thus, even with the presence of a filter/drier unit, water content may creep up over time and may exceed normal standards (e.g., exceeding an exemplary 30 ppm limit and reaching 50 ppm or more or 75 ppm or more or 100 ppm or more or 150 ppm or more). Thus enhanced resistance to water induced corrosion may be offered.

For example, a typical chiller used for air conditioning application may operate at approximately 5° C. or 41° F. in the evaporator. At this temperature, the pressure of R1233zd(E) is 58.7 kPa(a) or 8.5 PSIA compared to standard atmospheric pressure of 101.3 kPa(a) or 14.7 PSIA. A commonly used medium pressure refrigerant R134a has a pressure of 349.9 kPa or 50.7 PSIA at this temperature. Chillers are typically equipped with molecular sieve driers in order to capture moisture. For medium pressure chillers this filter mainly captures moisture introduced when servicing or when adding refrigerants. However, for a low pressure chiller there is a significant risk of continuously having water and air entering the system. Because it is virtually impossible to prevent air and water to enter a system operating below atmospheric pressure, a low pressure chiller is typically equipped with a purge unit that removes non-condensable gasses by condensing vapor from the condenser into a trap that is vented as the non-condensable gasses are trapped. However, it is possible that, over time, the water content is sufficient to saturate the drier and the chiller will experience an increase in moisture content. Thus, benefit of the corrosion protection offered by the small amount of oil may be seen even with such a drier. The oil may also offer a safety margin that allows less intensive purge unit use, a smaller purge unit, or the like.

FIG. 1 further shows a controller 900. The controller may receive user inputs from an input device (e.g., switches, keyboard, or the like) and sensors (not shown, e.g., pressure sensors and temperature sensors at various system locations). The controller may be coupled to the sensors and controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

A control routine may be programmed or otherwise configured into the controller. The routine provides for switching between the FIG. 1 and FIG. 2 modes and may be superimposed upon the controller's normal programming/ routines (not shown, e.g., providing the basic operation of a baseline system to which the foregoing control routine is added).

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A vapor compression system (20) comprising:
   a centrifugal compressor (22) having:
      an inlet (40) and an outlet (42); and
      an electric motor (28) having:
         a stator (30); and
         a rotor (32);
      a plurality of bearings (36) supporting the rotor;
   a refrigerant charge comprising a base refrigerant and one or more oils,
   wherein:
      the plurality of bearings are rolling element bearings;
      wherein the system lacks an oil separator and oil reservoir;
      the one or more oils are present at a total concentration of 80-5000 parts per million (ppm) by weight; and
      the system further comprises a protective coating on the bearings, the protective coating comprising a metal-halide based under layer and a carbonaceous polymer upper layer.

2. The system of claim 1 further comprising:
   a condenser (58);
   an evaporator (88);
   a suction line (94) along a flowpath between the evaporator and an inlet of a first stage (24) of the compressor;
   a flowpath leg from a discharge (48) of the first stage to a second stage (26) inlet (50); and
   a discharge line (56) along a flowpath between a discharge (42) of the second stage and an inlet (60) of the condenser.

3. The system of claim 2 lacking an oil separator and an oil reservoir.

4. The system of claim 1 wherein:
   the charge is at least 95% by weight said base refrigerant.

5. The system of claim 1 wherein:
   the base refrigerant is one or more hydrofluoroolefins, hydrochloroolefins, and/or hydrochlorofluoroolefins.

6. The system of claim 5 wherein:
   the base refrigerant is trans 1-chloro, 3,3,3-fluoropropene (R1233zd(E)).

7. The system of claim 1 wherein:
   the oil is a hindered polyol ester formed from the condensation reaction of polyhydric alcohols with medium molecular weight (C5-C10) monohydric fatty acids.

8. The system of claim 1 wherein:
   the refrigerant consists essentially of the base refrigerant and the one or more oils.

9. The system of claim 1 wherein:
   the refrigerant has no more than 200 ppm each of all additional constituents beyond the base refrigerant, the one or more oils, and water.

10. The system of claim 1 wherein:
    the oil is present at a concentration of 200-3000 ppm by weight.

11. The system of claim 1 wherein:
    the oil is present at a concentration of 200-1500 ppm by weight.

12. The system of claim 1 wherein:
    the oil is present at a concentration of 300-700 ppm by weight.

13. The system of claim 12 wherein:
    the oil is present as a polyol ester at said concentration.

14. The system of claim 1 wherein:
    the refrigerant comprises 50-200 ppm by weight water contaminant.

15. A method for using the system of claim 1, the method comprising:
    passing to the bearings a flow of refrigerant with the one or more oils present at a concentration of 80-5000 parts per million (ppm) by weight.

16. A method for operating a vapor compression system (20), the vapor compression system comprising:
    a centrifugal compressor (22) having:
       an inlet (40) and an outlet (42); and
       an electric motor (28) having:
          a stator (30); and
          a rotor (32);
       at least one impeller coupled to the electric motor; and
       a plurality of bearings (36) supporting at least one of the rotor and the impeller;
    a refrigerant charge comprising a base refrigerant and an oil,
    the method comprising:
       passing to the bearings a lubricating flow of refrigerant with the oil present at a concentration of 80-5000 parts per million (ppm) by weight; and
       the oil reacts to form a protective coating on the bearings, the protective coating comprising a metal-halide based under layer and a carbonaceous polymer upper layer.

17. The method of claim 16 wherein:
    the oil is a polyol ester.

18. The method of claim 17 wherein:
    the refrigerant comprises trans 1-chloro, 3,3,3-fluoropropene (R1233zd(E)).

* * * * *